(12) United States Patent
Inoue et al.

(10) Patent No.: US 6,944,181 B2
(45) Date of Patent: Sep. 13, 2005

(54) MOBILE IP COMMUNICATION SCHEME FOR SUPPORTING MOBILE COMPUTER MOVE OVER DIFFERENT ADDRESS SPACES

(75) Inventors: Atsushi Inoue, Tokyo (JP); Masahiro Ishiyama, Tokyo (JP); Atsushi Fukumoto, Tokyo (JP); Yoshiyuki Tsuda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 397 days.

(21) Appl. No.: 10/206,364

(22) Filed: Jul. 29, 2002

(65) Prior Publication Data

US 2002/0186693 A1 Dec. 12, 2002

Related U.S. Application Data

(62) Division of application No. 09/146,956, filed on Sep. 4, 1998, now Pat. No. 6,501,767.

(30) Foreign Application Priority Data

Sep. 5, 1997 (JP) .......................................... P09-241156

(51) Int. Cl.[7] .............................. H04J 3/16; H04J 3/22
(52) U.S. Cl. ........................ 370/465; 370/352; 370/392
(58) Field of Search ................................ 370/465, 466, 370/469, 467, 401, 471, 475, 389, 392, 352, 356; 709/245, 227, 228, 230; 713/150, 153, 200, 201; 455/432.1, 432.2, 433, 435.1

(56) References Cited

U.S. PATENT DOCUMENTS

| | | | |
|---|---|---|---|
| 5,636,216 A | | 6/1997 | Fox et al. |
| 5,856,974 A | * | 1/1999 | Gervais et al. ............. 370/392 |
| 5,884,297 A | * | 3/1999 | Noven ...................... 370/395.3 |
| 5,946,615 A | * | 8/1999 | Holmes et al. .......... 455/412.1 |
| 6,075,776 A | | 6/2000 | Tanimoto et al. |
| 6,088,725 A | | 7/2000 | Kondo et al. |
| 6,101,188 A | | 8/2000 | Sekine et al. |
| 6,119,171 A | | 9/2000 | Alkhatib |
| 6,128,664 A | | 10/2000 | Yanagidate et al. |
| 6,163,843 A | | 12/2000 | Inoue et al. |
| 6,167,513 A | | 12/2000 | Inoue et al. |

OTHER PUBLICATIONS

C. Perkins, "IP Mobility Support," Network Working Group, Oct. 1996, pp. 1–79.

* cited by examiner

Primary Examiner—Brian Nguyen
(74) Attorney, Agent, or Firm—Foley & Lardner LLP

(57) ABSTRACT

A mobile IP communication scheme for supporting a mobile computer moving over different address spaces is disclosed. A packet relay device for relaying packets having an address of the mobile computer device as a destination or source is provided at a border between a private address space and a global address space, where the packet relay device has a packet receiving unit for receiving a packet in a first format using a global address which is transmitted by the mobile computer for a location registration from a visited site managed by a global address system, and checking a content of the packet, and a packet transfer unit for transferring the packet in a second format using a private address, to a correspondent computer in a home network of the mobile computer managed by a private address system, according to the content of the packet.

3 Claims, 7 Drawing Sheets

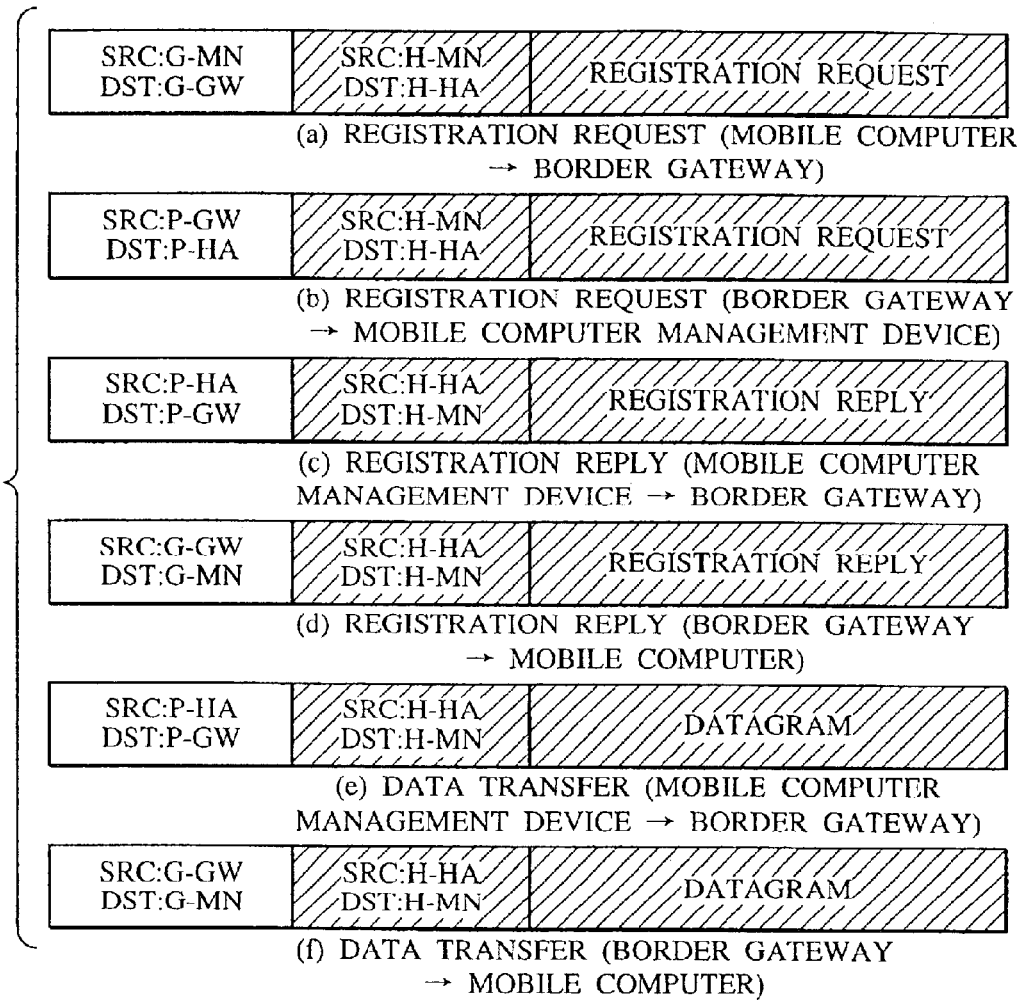

MOBILE IP COMMUNICATION SCHEME FOR SUPPORTING MOBILE COMPUTER MOVE OVER DIFFERENT ADDRESS SPACES

This application is a division of Ser. No. 09/146,956, filed Sep. 4, 1998, now U.S. Pat. No. 6,501,767.

BACKGROUND OF THE INVENTION

1. Field of the Invention

The present invention relates to a mobile IP communication scheme, and more particularly, to a mobile computer device capable of carrying out communications while moving over a plurality of inter-connected networks, and a packet relay device for relaying data packets having the mobile computer device as destination or source, as well as a packet relay method, a packet transmission method and a packet transfer method used by these devices.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used.

In particular, in recent years, the use of the world's largest computer network called "Internet" has become very popular, and there are new computer businesses for connecting to the Internet and utilizing open information and services, or for providing information and services to external users who make accesses through the Internet. In addition, new technological developments are made in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

In general, in a case of realizing the mobile computing, a router (home agent) for managing the visiting site information of the mobile computer is provided at a network (home network) to which the mobile computer belongs, and when the mobile computer is away from the home network, the mobile computer sends a registration message for indicating a current location to this home agent. When this registration message is received, the transmission of data destined to the mobile computer As realized by capturing it by the home agent, and carrying out the data routing control with respect to the mobile computer by encapsulating an IP packet destined to an original address of the mobile computer within a packet destined to a current location address of the mobile computer.

For example, in FIG. 1, this role is played by a home agent (HA) 105 in a case where the mobile computer 102 that originally belongs to the home network 101a moves to another network 101b and carries out the communication with another computer (correspondent host: CH) 103 within the other network 101c. This is a scheme called mobile IP which is currently in a process of being standardized by the mobile-IP working group of the IETF which is the standardizing organization for the Internet (see, IETF RFC 2002, IP mobility support (C. Perkins)).

Also, when the networks are wide spread and free connections among networks are realized so that huge amount of data and services can be exchanged, there arises a need to account for the problem of security.

For example, there is a problem as to how to prevent the leakage of the secret information of the organization to the external network, and there is also a problem as to how to protect resources and information connected to the domestic network. The Internet was developed originally for the academic purpose so that the primary concern was the free data and service exchanges by the network connections and the above described problem of security has not been accounted for.

However, in recent years, many corporations and organizations are connecting to the Internet so that there is a need for a mechanism to guard the own network in view of the above described problem of security.

To this end, there is a known scheme for use at a time of exchanging a data packet on the Internet, in which the content of the data packet is to be encrypted and an authentication code is to be attached before the transmission of the data packet to the external, and the authentication code is to be verified and the data packet is to be decrypted at a received site. According to this scheme, even when an outside user picks up the data packet on the external network, the leakage of data content can be prevented because the data content is encrypted, and therefore the secure communication can be realized.

A mutual cipher communication is possible between networks which are protected (guarded) by gateway computers that support such a cipher communication, and when the above described mobile computer itself supports a function of the packet encryption and decryption, a cipher communication between any gateways or a gateway and a mobile computer can be supported.

For example, in an exemplary case shown in FIG. 1, a mobile computer 102 that originally belongs to a home network 101a moves to another network 101b and carries out a cipher communication with another computer (CH: Correspondent Host) 103 in a network 101c, through gateways 104a and 104c that support the encryption/decryption function.

In FIG. 1, when the communications are carried out by using the mobile IP scheme in combination with the packet encryption scheme, a packet transfer route will be as follows: correspondent host (CH) 103→gateway 104c→gateway 104a→home agent (HA) 105→gateway 104a→mobile computer 102. At the gateway 104a, the packet is decrypted once and sent to the home agent 105, and later on, the packet transmitted from the home agent 105 is encrypted again.

Now, in the mobile IP scheme, the protocol is configured by presupposing only the case where the mobile computer moves over a single address space. Namely, it is assumed that the current location registration message from the visited site is always capable of reaching to the home agent on the home network. However, nowadays, when a large scale organization is connected to the Internet, it is rare to allocate global IP addresses to all the hosts within the organization due to the problem of IP address shortage, and it is more common to operate within the organization using private addresses (RFC 1597) and carry out the address translation into the global address in the case of communicating with the external.

In general, a scheme called NAT (Network Address Translation) is often employed as a scheme for transferring a packet originated from a private address to a global address region. The NAT is a scheme in which a correspondence between the private address on an inner side and the global address on an outer side is managed according to information such as a port number of an IP packet, and a packet is transferred by applying appropriate address translation.

However, when the packet encryption scheme is used in combination as described above, this mechanism for distributing packets according to the port numbers does not work properly. Also, when the mobile IP scheme is used in combination, the registration request message is initially transmitted from the mobile computer that has moved to the external, and the correspondence between the private address on an inner side and the global address on an outer side is established at a timing of this message, so that the direction of actions involved is opposite to that of the conventional NAT scheme.

In other words, in the system which uses the mobile IP scheme and the packet encryption scheme in combination, there is a need to provide a scheme for establishing a correspondence between the global address and the private address, which is operable even when a region of the port number or the like is hidden as a result of encryption of the packet content, and which is also operable even in the case where an external mobile computer initiates a communication session.

As described, in the case of supporting mobile computers by utilizing the mobile IP scheme in general, when a mobile computer moves over a plurality of addresses spaces (as in the case of moving from a private one to a global one), there is a need to provide a scheme for controlling a packet format of a registration request to be transmitted to a home agent of a home network depending on a current location of the mobile computer, and a scheme for receiving a transmitted packet once at an entrance of the organization that is located at a border between the private network and the global network, and transferring it to a corresponding home agent inside the organization after checking its content.

Thus, in the conventional mobile IP scheme, the protocol has been configured under the assumption of reachability from the mobile computer to the home network, so that there has been a constraint that the mobile computer can only move within the address space common to the home network. For this reason, when the organization is operated using the private addresses, there has been a drawback that the mobile IP scheme cannot be used directly if the mobile computer moves outside of the organization network (to the global address region).

SUMMARY OF THE INVENTION

It is therefore an object of the present invention to provide a mobile IP communication scheme for a computer system in which a plurality of computers can communicate with each other by being mutually connected through a plurality of inter-connected communication networks where an automatic routing control for the mobile computer is supported by the mobile IP scheme, which is capable of realizing the following mobile computer control. Namely, in this scheme, a packet such as that of a location registration message originating from the mobile computer that has moved to a region under the address management different from the home network is received once at an entrance of the organization network, and transferred to a corresponding home agent within the organization after checking its content, while the mobile computer side generates and transmits a packet in appropriate format according to its own current location.

Specifically, the present invention provides a mobile computer device, a packet relay device, a mobile computer management device, a packet relay method, a packet transmission method and a packet transfer method for realizing such a mobile IP communication scheme.

According to one aspect of the present invention there is provided a packet relay device in a network system supporting a mobile computer that is capable of carrying out communications while moving over a plurality of inter-connected networks, for relaying packets having an address of the mobile computer device as a destination or source, the packet relay device comprising: a packet receiving unit for receiving a packet in a first format using a global address which is transmitted by the mobile computer for a location registration from a visited site managed by a global address system, and checking a content of the packet; and a packet transfer unit for transferring the packet in a second format using a private address, to a correspondent computer in a home network of the mobile computer managed by a private address system, according to the content of the packet.

According to another aspect of the present invention there is provided a mobile computer device capable of carrying out communications while moving over a plurality of inter-connected networks, comprising: a current location setting unit for storing an information indicating whether or not the mobile computer device is currently connected to a private address space identical to that of a home network in which a mobile computer management device for managing a current location address of the mobile computer device and transferring a packet destined to the mobile computer device to the current location address is provided; a relay device information unit for storing a global address in a global address space of a packet relay device which is provided at a border between the private address space and the global address space and relaying a packet to be exchanged between one computer connected to the private address space and another computer connected to the global address space; and a transmission unit for transmitting to the packet relay device at least a registration request packet that is containing the current location address and destined to the mobile computer management device, by using the global address stored by the relay device information unit, when the current location setting unit stores the information indicating that the mobile computer device is currently not connected to the private address space.

According to another aspect of the present invention there is provided a mobile computer management device provided at a home network of a mobile computer that is capable of carrying out communications while moving over a plurality of inter-connected networks, the mobile computer management device comprising: a memory unit for storing in correspondence at least a home address of the mobile computer and a current location address of the mobile computer when the mobile computer is moving outside the home network; a registration unit for decrypting an encrypted packet received from a packet relay device and registering the current location address into the memory unit when a decrypted packet is a registration request packet containing the current location address which is transmitted from the mobile computer to the mobile computer management device, the packet relay device being provided at a border between a private address space by which the home network is managed and a global address space and relaying a packet to be exchanged between one computer connected to the private address space and another computer connected to the global address space; and a transfer unit for transferring a packet destined to a home address of the mobile computer in the home network to the current location address according to the memory unit.

According to another aspect of the present invention there is provided a packet relay method in a network system supporting a mobile computer that is capable of carrying out communications while moving over a plurality of inter-connected networks, for relaying packets having an address of the mobile computer device as a destination or source, the method comprising the steps of: receiving a packet in a first format using a global address which is transmitted by the mobile computer for a location registration from a visited site managed by a global address system, and checking a content of the packet; and transferring the packet in a second format using a private address, to a correspondent computer in a home network of the mobile computer managed by a private address system, according to the content of the packet.

According to another aspect of the present invention there is provided a packet transmission method in a mobile computer device capable of carrying out communications while moving over a plurality of inter-connected networks, the method comprising the steps of: (a) storing an information indicating whether or not the mobile computer device is currently connected to a private address space identical to that of a home network in which a mobile computer management device for managing a current location address of the mobile computer device and transferring a packet destined to the mobile computer device to the current location address is provided; (b) storing a global address in a global address space of a packet relay device which is provided at a border between the private address space and the global address space and relaying a packet to be exchanged between one computer connected to the private address space and another computer connected to the global address space; and (c) transmitting to the packet relay device at least a registration request packet that is containing the current location address and destined to the mobile computer management device, by using the global address stored at the step (b), when the step (a) stores the information indicating that the mobile computer device is currently not connected to the private address space.

According to another aspect of the present invention there is provided a packet transfer method in a mobile computer management device provided at a home network of a mobile computer that is capable of carrying out communications while moving over a plurality of inter-connected networks, the method comprising the steps of: storing in correspondence at least a home address of the mobile computer and a current location address of the mobile computer when the mobile computer is moving outside the home network, in a memory; decrypting an encrypted packet received from a packet relay device and registering the current location address into the memory when a decrypted packet is a registration request packet containing the current location address which is transmitted from the mobile computer to the mobile computer management device, the packet relay device being provided at a border between a private address space by which the home network is managed and a global address space and relaying a packet to be exchanged between one computer connected to the private address space and another computer connected to the global address space; and transferring a packet destined to a home address of the mobile computer in the home network to the current location address according to the memory.

According to another aspect of the present invention there is provided an article of manufacture, comprising: a computer usable medium having computer readable program code means embodied therein for causing a computer to function as a packet relay device in a network system supporting a mobile computer that is capable of carrying out communications while moving over a plurality of inter-connected networks, for relaying packets having an address of the mobile computer device as a destination or source, the computer readable program code means includes: first computer readable program code means for causing said computer to receive a packet in a first format using a global address which is transmitted by the mobile computer for a location registration from a visited site managed by a global address system, and check a content of the packet; and second computer readable program code means for causing said computer to transfer the packet in a second format using a private address, to a correspondent computer in a home network of the mobile computer managed by a private address system, according to the content of the packet.

According to another aspect of the present invention there is provided an article of manufacture, comprising: a computer usable medium having computer readable program code means embodied therein for causing a computer to function as a mobile computer device capable of carrying out communications while moving over a plurality of inter-connected networks, the computer readable program code means includes: first computer readable program code means for causing said computer to store an information indicating whether or not the mobile computer device is currently connected to a private address space identical to that of a home network in which a mobile computer management device for managing a current location address of the mobile computer device and transferring a packet destined to the mobile computer device to the current location address is provided; second computer readable program code means for causing said computer to store a global address in a global address space of a packet relay device which is provided at a border between the private address space and the global address space and relaying a packet to be exchanged between one computer connected to the private address space and another computer connected to the global address space; and third computer readable program code means for causing said computer to transmit to the packet relay device at least a registration request packet that is containing the current location address and destined to the mobile computer management device, by using the global address stored by the second computer readable program code means, when the first computer readable program code means stores the information indicating that the mobile computer device is currently not connected to the private address space.

According to another aspect of the present invention there is provided an article of manufacture, comprising: a computer usable medium having computer readable program code means embodied therein for causing a computer to function as a mobile computer management device provided at a home network of a mobile computer that is capable of carrying out communications while moving over a plurality of inter-connected networks, the computer readable program code means includes: first computer readable program code means for causing said computer to store in correspondence at least a home address of the mobile computer and a current location address of the mobile computer when the mobile computer is moving outside the home network, in a memory; second computer readable program code means for causing said computer to decrypt an encrypted packet received from a packet relay device and register the current location address into the memory when a decrypted packet is a registration request packet containing the current location address which is transmitted from the mobile computer to the mobile computer management device, the packet relay device being provided at a border between a private address space by which the home network is managed and a global address space and relaying a packet to be exchanged between one computer connected to the private address space and another computer connected to the global address space; and third computer readable program code means for causing said computer to transfer a packet destined to a home address of the mobile computer in the home network to the current location address according to the memory.

Other features and advantages of the present invention will become apparent from the following description taken in conjunction with the accompanying drawings.

BRIEF DESCRIPTION OF THE DRAWINGS

FIG. 5 is a diagram showing exemplary packet formats of various packets that can be used in the network system of FIG. 2.

FIG. 6 is a diagram showing an exemplary form of a management table that can be used in a border gateway and a mobile computer management device in the network system of FIG. 2.

Referring now to FIG. 2 to FIG. 9, one embodiment of the mobile IP communication scheme according to the present invention will be described in detail.

DETAILED DESCRIPTION OF THE PREFERRED EMBODIMENTS

Referring now to FIG. 2 to FIG. 9, one embodiment of the mobile IP communication scheme according to the present invention will be described in detail.

Figure 1:
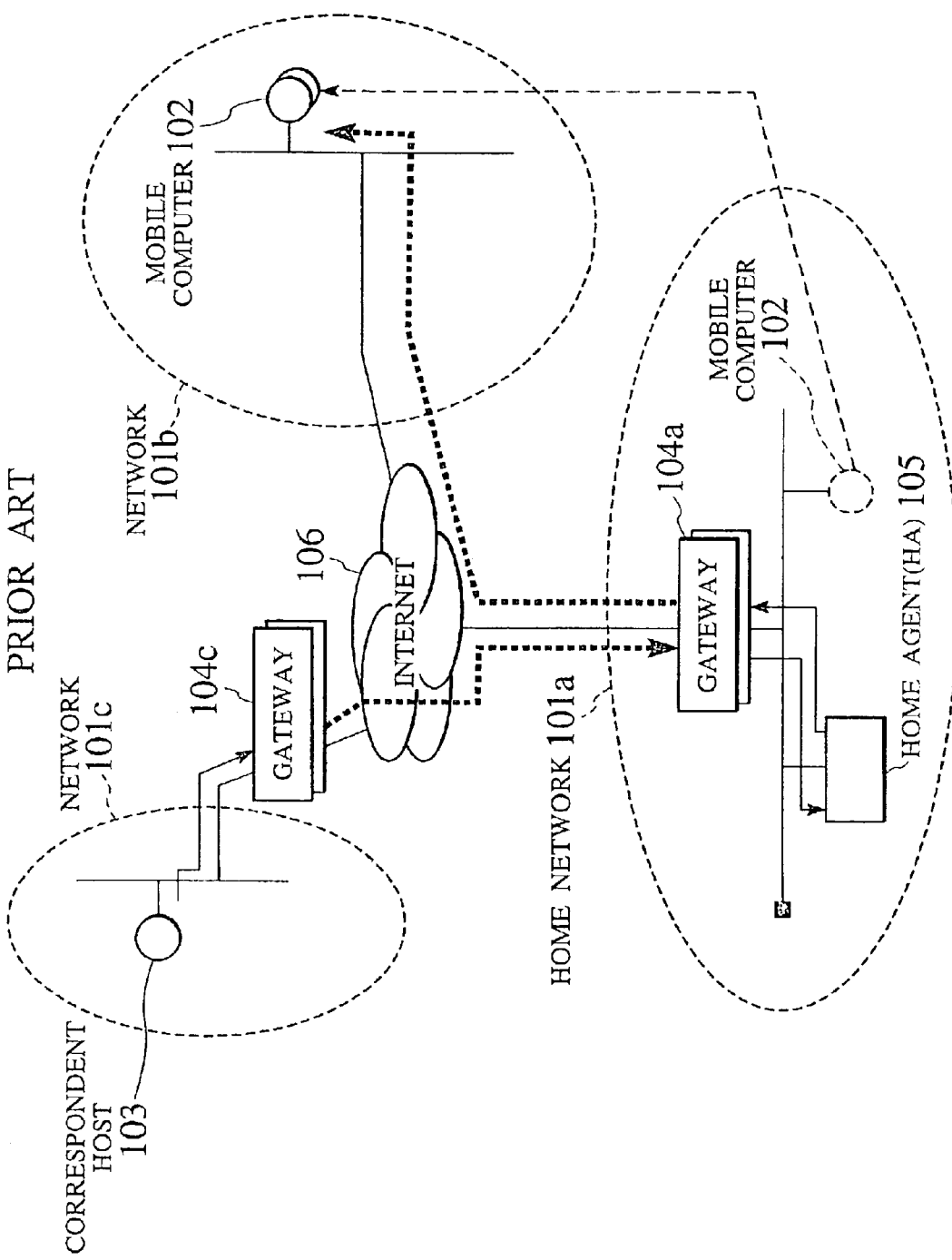
FIG. 1 is a schematic diagram showing a network system using a conventional mobile IP scheme.
Figure 2:
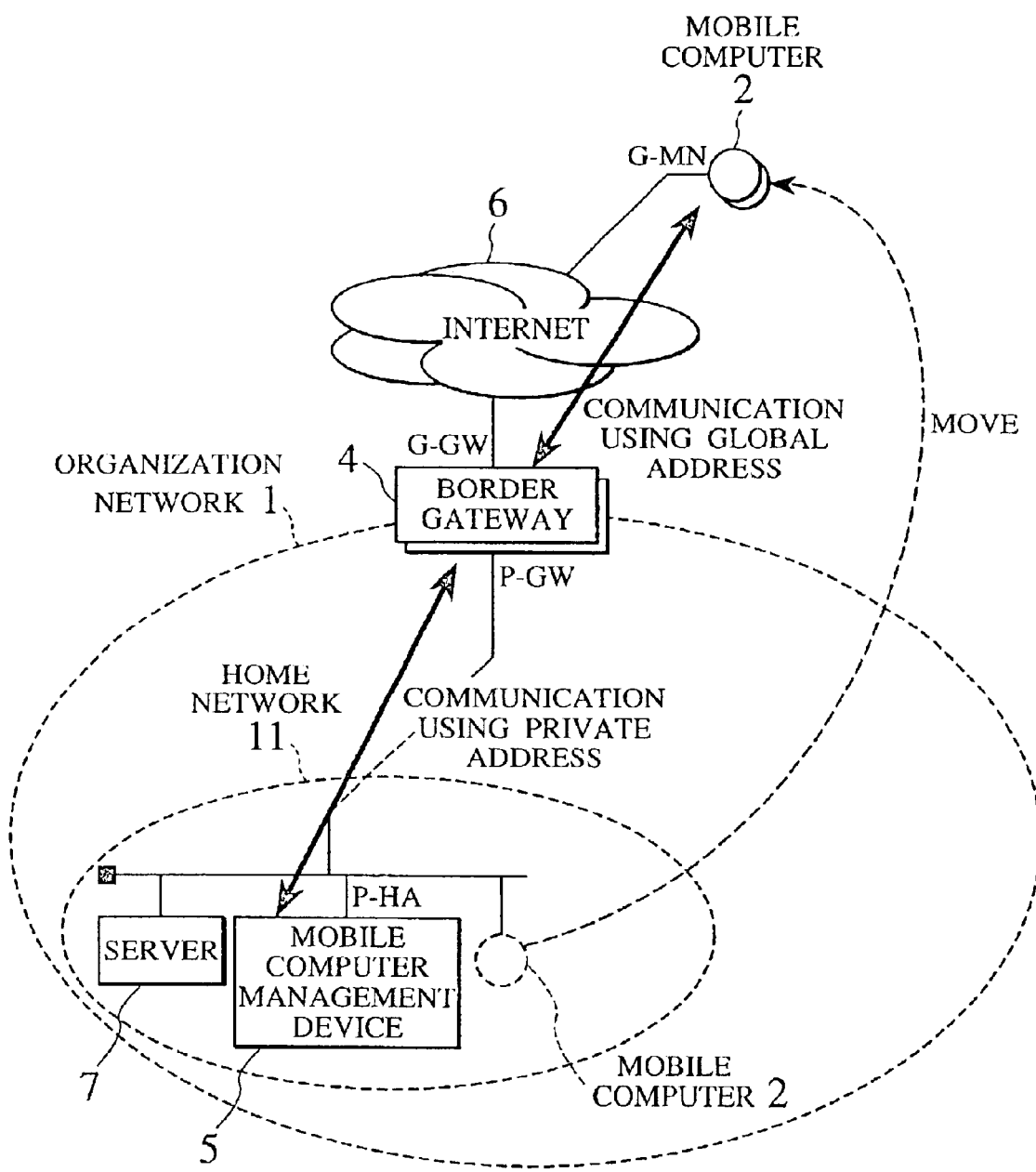
FIG. 2 is a schematic diagram showing a network system using a mobile IP communication scheme according to one embodiment of the present invention.

FIG. 2 shows a basic configuration of a network system according to this embodiment, where a home network 11 is present within an organization network 1. The entire organization network 1 (such as an intra-enterprise network) is operated using private addresses. A mobile computer 2 is originally connected to the home network 11, but here it is assumed that the mobile computer 2 is currently moved outside the organization network 1 and connected to a location which is operated using global addresses.

In the home network 11, there is provided a mobile computer management device 5 which has a packet encryption function and a home agent function (a function for managing a current location of the mobile computer and transferring a transmitted packet destined to the mobile computer to the current location by encapsulating the packet) according to the mobile IP.

At the exit of the organization network 1, that is, at a border between the organization network 1 and the Internet 6, there is provided a border gateway 4. This border gateway 4 has two interfaces and a global address used outside the organization (the Internet side) as well as a private address used inside the organization.

Note that the cipher communications are used for the data transfer between nodes in this embodiment, and it is assumed that the cipher communications between bodes use a common key which is uniquely defined and shared between these nodes. Here, either this common key is shared between nodes in advance, or a procedure for key sharing between nodes is carried out when the need arises.

In the following, the operation of this embodiment will be described in detail for an exemplary case where the mobile computer 2 carries out exchanges regarding the location registration with the mobile computer management device 5 in the home network 11 from its visited site, and an exemplary case where the mobile computer 2 carries out communications with a server 7.

Figure 3:
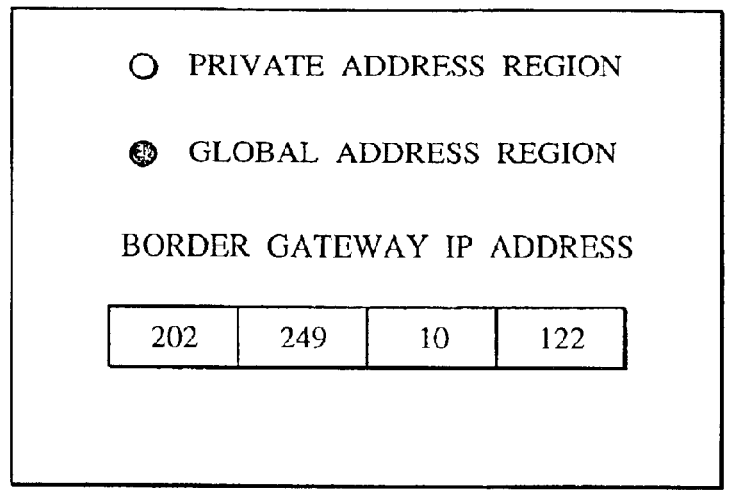
FIG. 3 is a diagram showing one exemplary form of a control panel that can be used at a mobile computer in the network system of FIG. 2.

At the mobile computer 2 side, an information regarding a current location to which it is currently connected is set up using a control panel of an exemplary form as shown in FIG. 3. Here, a "Private Address Region" marking indicates that the mobile computer 2 has moved within the organization network 1 that is operated using the same private address system, while a "Global Address Region" marking insicates that the mobile computer 2 has moved outside the organization network 1. In FIG. 3, a marking with a blank dot is an unmarked one and a marking with a black dot is a marked one.

When the "Global Address Region" is selected, the global address of the border gateway 4 (which is assumed to be "202,249,10,122" in this example) is also set at a "Broder Gateway IP address" field as shown in FIG. 3. In addition, its own current location address is also set at a corresponding set up field which is not shown in FIG. 3.

Figure 4:
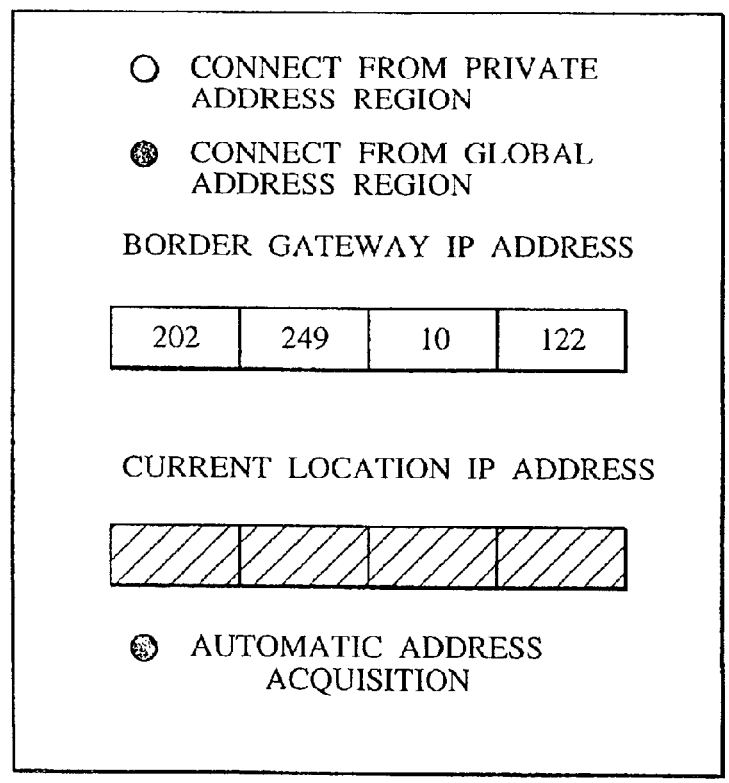
FIG. 4 is a diagram showing another exemplary form of a control panel that can be used at a mobile computer in the network system of FIG. 2.

Note that the user makes the setting explicitly in the above, but it is also possible to set these information automatically according to negotiation messages used at a time of making a connection with the Internet provider server by PPP (Point-to-Point Protocol), for example. Namely, in the case of making an IP connection with the Internet provider by the protocol called PPP through a telephone channel in general, an address allocated by a protocol called IPCP (Internet Protocol Control Protocol) is determined at a time of an initial setting of the PPP. In such a case, any particular address cannot be set up at the mobile computer 2 side, so that a setting button for "Automatic Address Acquisition" (or "Automatic Address Allocation from ISP (Internet Service Provider) side") is additionally provided as shown in FIG. 4, and this setting button is selected. When this setting button is selected, the IP address acquired in the course of PPP processing is directly set as the current location IP address.

Next, the operation to transmit the location registration message when the current location is set by using the control panel of FIG. 3 (or automatically) is carried out as follows.

First, the case of moving within a private network will be described.

When the information indicating that the mobile computer 2 has moved within a private network of the organization (the enterprise, for example) is set, the mobile computer 2 transmits a registration request packet to the mobile computer management device 5 in the home network 11 by encrypting a payload of the packet using a key corresponding to the mobile computer management device 5 which is a destination of this packet, as specified by the usual mobile IP scheme.

Upon receiving this encrypted registration request packet, the mobile computer management device 5 decrypts the packet using a key corresponding to the mobile computer 2 which is a source of this packet, and checks the content of the decrypted packet. When it is ascertained from an identification information (such as a code described in a packet type field) inside the packet header that this is a registration request of the mobile IP, the home address and the current location address of this mobile computer 2 are taken out from the packet, and registered in a management table as shown in FIG. 6. Also, a reply packet (a registration success packet) corresponding to the registration request is returned to the mobile computer 2 by encrypting its payload using a key corresponding to the mobile computer 2 which is a destination of this packet.

Note that, in FIG. 6, "Home-addr" indicates the home address of the mobile computer 2, "Current-addr" indicates the current location address of the mobile computer 2, and "Keys" indicates a key to be used in encrypting or decrypting a packet having the corresponding "Home-addr" and "Current-addr" pair at a time of transferring the packet, which are stored in correspondence to a transfer target node.

Upon receiving the encrypted reply packet, the mobile computer 2 decrypts the packet using a key corresponding to the mobile computer management device 5 which is a source of this packet, and recognizes from the decrypted reply packet that the registration was successfully made.

Next, the case of moving to a global network outside the organization will be described.

When the information indicating that the mobile computer 2 has moved to a global network outside the organization is set, the mobile computer 2 transmits a registration request packet of the mobile IP which is encrypted using a corresponding key, to the global address interface of the border gateway 4 at the exit of the organization network 1 using the address set at the "Border Gateway IP address" field. A packet format of this packet is shown in a part (a) of FIG. 5, where the shaded portion indicates the encrypted portion (the same also apply to other parts (b) to (f) of FIG. 5).

When the encrypted packet destined to itself arrives, the border gateway 4 checks its source, decrypts this packet using a key corresponding to its source (the mobile computer 2 in this case), and checks the content of the descrypted packet. When it is ascertained from an identification information (such as a code described in a packet type field) inside the packet header that this is a registration request of the mobile IP, the home address and the current location address of this mobile computer 2 are taken out from the packet, and registered in a management table as shown in FIG. 6.

Then, the border gateway 4 re-encrypts the location registration packet using a key corresponding to the mobile computer management device 5 of the home network 11 which is the transfer target, and transfers the encrypted packet to the mobile computer management device 5. A packet format for this packet is shown in a part (b) of FIG. 5.

Upon receiving the relayed and re-encrypted registration request packet from the border gateway 4, the mobile computer management device 5 of the home network 11 checks its source from the packet header, decrypts this packet using a key corresponding to the border gateway 4 which is its source (according to a header of the encrypted packet), and checks the content of the decrypted packet. When It is ascertained from an identification information inside the packet header that this is a registration request of the mobile IP, the home address and the current location address of the mobile computer 2 which is an original source of this registration request packet are taken out from the packet, and registered in a management table as shown in FIG. 6.

In addition, in order to return a reply packet (a registration success packet) corresponding to the registration request to the mobile computer 2, the mobile computer management device 5 transmits the reply packet encrypted using a key corresponding to the border gateway 4, to the border gateway 4 which is a next hop node (relay node). A packet format of this packet is shown in a part (c) of FIG. 5.

Upon receiving the encrypted reply packet from the mobile computer management device 5, the border gateway 4 checks its source, descrypts this packet using a key corresponding to the mobile computer management device 5 which is its source, and checks the content of the decrypted packet. When it is ascertained from an identification information inside the packet header that this is a reply packet of the mobile IP, the current location address of the mobile computer 2 is obtained from the home address of the mobile computer 2 as described within the packet header and the management table of FIG. 6, and the reply packet re-encrypted using a key corresponding to the mobile computer 2 is transferred to the obtained current location address of the mobile computer 2. A packet format of this packet is shown in a part (d) of FIG. 5.

Upon receiving the encrypted reply packet, the mobile computer 2 decrypts this packet using a key corresponding to the border gateway 4 which is its source (according to a header of the encrypted packet), and recognizes from the descrypted reply packet that the registration was successfully made.

When the registration request packet of the mobile IP is accepted as described above, thereafter the mobile computer management device 5 of the home network 11 captures a packet transmitted to the home address of the mobile computer 2, encapsulates it inside a packet destined to the current location address of the mobile computer 2 and further encrypts it using a key corresponding to the border gateway 4, and then transfers it to the private address of the border gateway 4. A packet format of this packet is shown in a part (e) of FIG. 5. Note that, in this part (e) of FIG. 5, a packet originated from a correspondent and destined to the home address of the mobile computer 2 is encapsulated in a datagram portion. Then, similarly as in the case of the reply to the location registration request described above, the border gateway 4 relays this packet and transfers it to the mobile computer 2 by re-encrypting it. A packet format of this packet is shown in a part (f) of FIG. 5.

Also, in the case where the mobile computer 2 transmits a packet to a correspondent server 7, if the address of the server 7 is a private address managed by the same policy as the mobile computer management device 5 of the home network 11, the mobile computer 2 transmits the packet to the global address of the border gateway 4 by encrypting it using a key corresponding to the border gateway 4, similarly as in the case of the registration request described above. Then, the border gateway 4 decrypts this packet once, and transfers it to the server 7 by converting it into an encrypted packet using the private address of the server 7.

As described, using the border gateway 4 of this embodiment, two separate encrypted packet transfer routes are constructed at the border between the global network and the private network so as to enable communications acrossing two address spaces.

Figure 7:
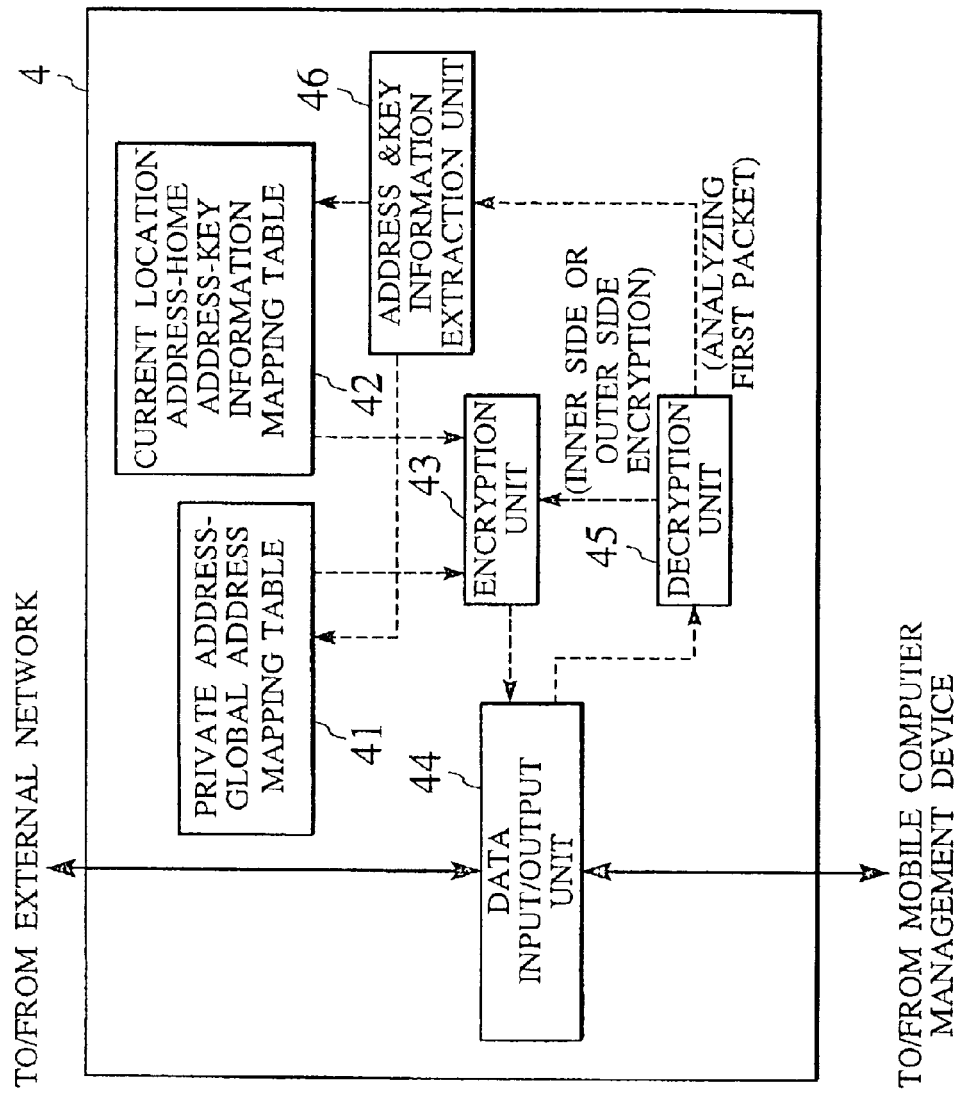
FIG. 7 is a block diagram showing an exemplary configuration of a border gateway in the network system of FIG. 2.

FIG. 7 shows an exemplary configuration of the border gateway 4 in this embodiment. In this border gateway 4 of FIG. 7, a private address-global address mapping table 41 and a current location address-home address-key information mapping table 42 are provided, and utilized by an encryption unit 43 in carrying out inner side or outer side encryption of packets to be transmitted from a data input/output unit 44 to the mobile computer management device 5 or the external network. Also, packets received from the mobile computer management device 5 or the external network at the data input/output unit 44 are decrypted by a decryption unit 45, and given to the encryption unit 43. Also, the first packet is given to an address and key information extraction unit 46 and analyzed there to extract the address and key information which is then appropriately stored in the private address-global address mapping table 41 and the current location address-home address-key information mapping table 42.

More specifically, when a packet originating from a global address is received at the data input/output unit 44, the home address key information and the current address information contained in the header are referred, and whether an entry corresponding to them exists or not in the current location address-home address-key information mapping table 42 is checked. If not, a new entry corresponding to them is entered. Then, the packet is decrypted at the decryption unit 45 by using this home address key. Then, the content is checked and the home address information is obtained, and this information is entered into the private address-global address mapping table 41.

In the case of the registration request packet destined to the home agent, the packet is encrypted at the encryption unit 43 using encryption for the private address side which is the inner side, and outputted to the home agent from the data input/output unit 44. In the case of the ordinary data packet destined to the correspondent host, the packet is encrypted at the encryption unit 43 using encryption for an encryption unit on the correspondent host side, and outputted from the data input/output unit 44. If the correspondent host is not guarded by an encryption unit, the packet is directly outputted from the data input/output unit 44.

On the other hand, when a packet from the home agent on the inner side is received at the data input/output unit 44, the home address key information and the current address information contained in the header are referred, and an entry corresponding to them is taken out from the current location address-home address-key information mapping table 42. Then, the packet is decrypted at the decryption unit 45 by using this home address key. Then, the corresponding entry is searched in the private address-global address mapping table 41, and the packet is encrypted at the encryption unit 43 using encryption for the global address side which is the outer side, and outputted from the data input/output unit 44 to the corresponding current address.

Figure 8:
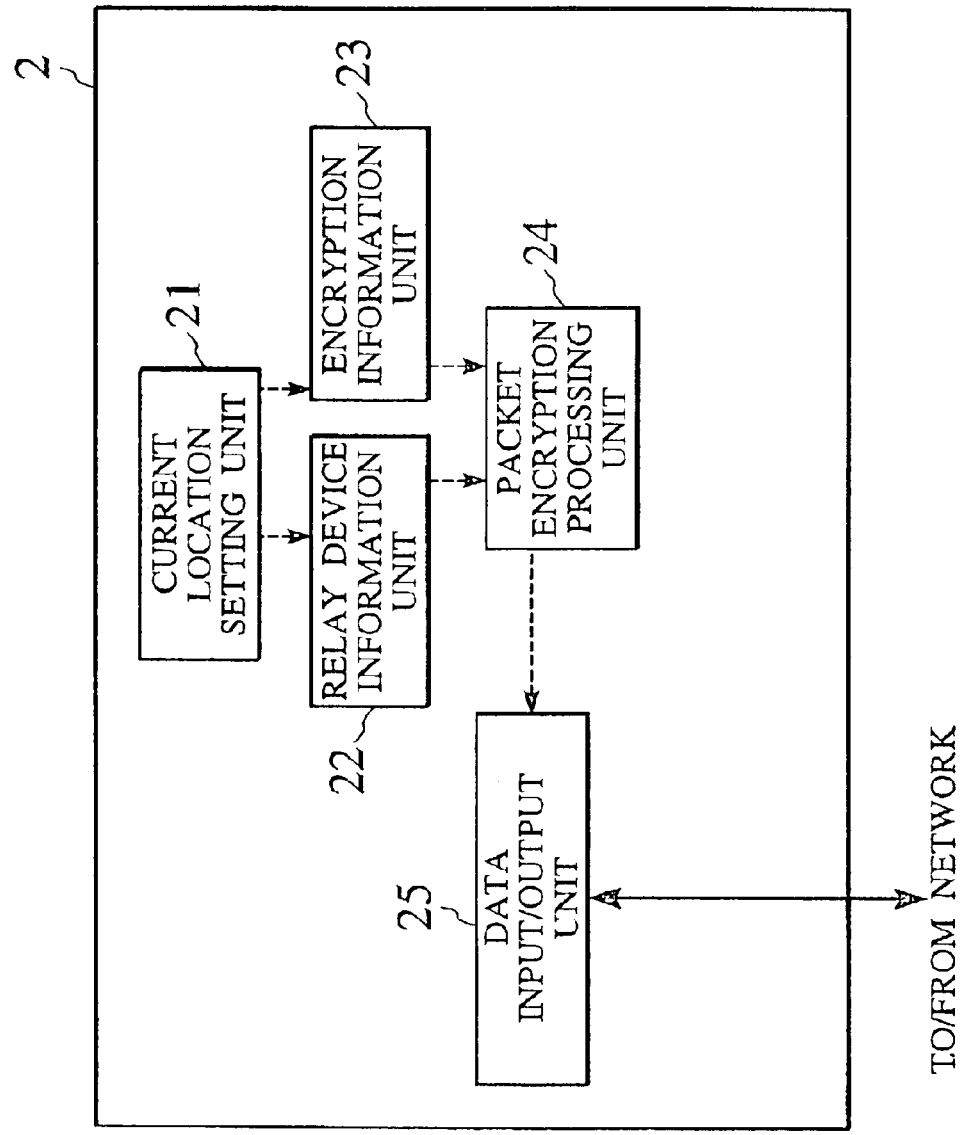
FIG. 8 is a block diagram showing an exemplary configuration of a mobile computer in the network system of FIG. 2.

FIG. 8 shows an exemplary configuration of the mobile computer 2 in this embodiment. In the mobile computer 2 of FIG. 8, a current location setting unit 21 is provided, and utilized by a relay device information unit 22 and an encryption information unit 23, which in turn are utilized by a packet encryption processing unit 24 in carrying out the encryption of packets to be transmitted from a data input/output unit 25 to the connected network.

More specifically, the current location setting unit 21 enters an address set at the visited site either by DHCP or manually (at the control panel), and an information as to whether it is currently located inside the organization or outside the organization. The global address of the border gateway of the own organization network is entered into the relay device information unit 22. The encryption information unit 23 holds an encryption information with respect to the border gateway of the organization network and an encryption information with respect to the home agent.

When the setting that this mobile computer is located inside the organization is made, the registration request is encrypted with respect to the home agent and outputted from the data input/output unit 25 (the data packet is transmitted to the correspondent host (or an encryption gateway that is guarding the corresponding host)). When the setting that this mobile computer is located outside the organization is made, the registration request is encrypted with respect to the border gateway, and outputted from the data input/output unit 25. In this case, the subsequent packets are also encrypted with respect to the border gateway and outputted from the data input/output unit 25.

Figure 9:
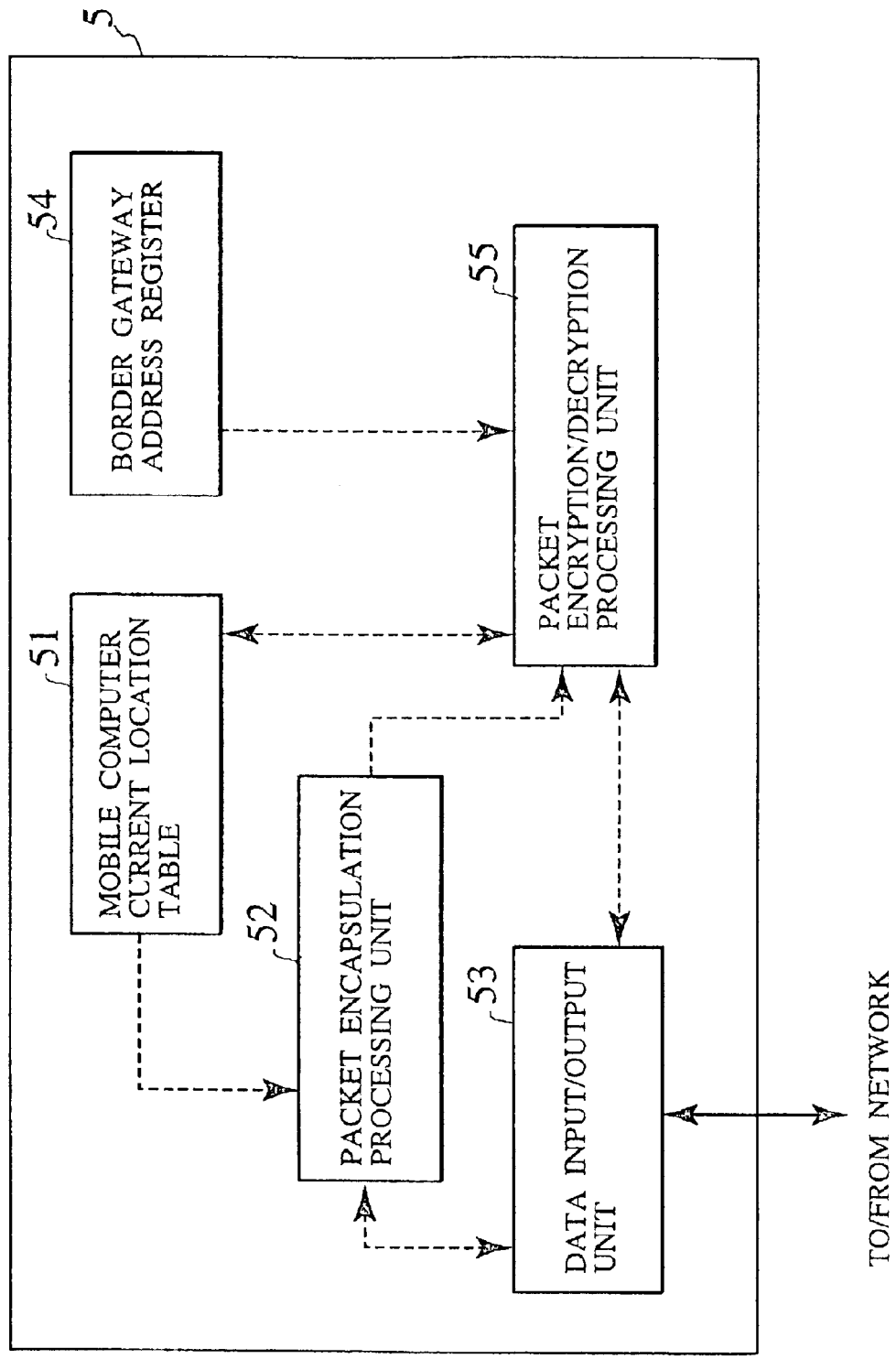
FIG. 9 is a block diagram showing an exemplary configuration of a home agent in the network system of FIG. 2.

FIG. 9 shows an exemplary configuration of the home agent 5 in this embodiment. In the home agent 5 of FIG. 9, a mobile computer current location table 51 is provided, and utilized by a packet encapsulation processing unit 52 in carrying out the encapsulation of packets to be transmitted from a data input/output unit 53 to the connected network. In addition, a border gateway address register 54 is provided, and utilized by a packet encryption/decryption processing unit 55 along with the mobile computer current location table 51 in carrying out the encryption/decryption processing with respect to the packets encapsulated by the packet encapsulation processing unit 52 or packets to be transmitted or received at the data input/output unit 53.

More specifically, when the registration request packet from the mobile computer is received at the data input/output unit 53, the packet is decrypted at the packet encryption/decryption processing unit 55 by using the home address key information contained in the header. Then, the home address and the current address information is entered into the mobile computer current location table 51 while checking whether the current address is a private one or a global one (which may be indicated by a flag held in the mobile computer current location table 51). If the current address is a private one, the reply packet is encrypted and directly outputted from the data input/output unit 53. If the current address is a global one, the reply packet is encrypted with respect to the border gateway that is registered in the border gateway address register 54 and outputted to that border gateway.

When a packet destined to the home address of the mobile computer is captured, the mobile computer current location table 51 is checked to obtain the current address, and the packet is encapsulated by the Mobile IP with respect to the current address. If the current address is a private one, the reply packet is encrypted and directly outputted from the data input/output unit 53. If the current address is a global one, the reply packet is encrypted with respect to the border gateway that is registered in the border gateway address register 54 and outputted to that border gateway.

As described, in the conventional mobile IP scheme, the mobile computer is permitted to move only within a single address space in which the reachability with respect to the home network is guaranteed, and in the case where an intra-organization network using private addresses is constructed for a large scale organization, it has been impossible to use the mobile IP scheme directly from a mobile computer that has moved to the global address region outside the organization. In contrast, according to the present invention, the mobile computer side is controlled to generate and transmit a packet in appropriate format according to its own current location, and the processing to receive the packet from the mobile computer once and transfer it to a corresponding home agent (the mobile computer management device) within the organization after checking its content is carried out at the entrance of the organization network, so that the mobile IP scheme can be used directly even when the organization network such as an intra-entrerprise network is operated using private addresses and the mobile computer moves to the global address region outside the organization.

In general, in the case of large scale organization network, logs of communication contents are often taken at the entrance of the organization network, so that the overhead due to the processing of the border gateway does not present any problem in practice. Moreover, the processing of the border gateway can be easily extended in the case of utilizing the other control mechansim such as firewall in addition.

Furthermore, by detecting the location of the mobile computer on the IP network within a sequence for making a connection to the Internet provider or the like, the control on the mobile computer side can be made even simpler.

Thus, according to the present invention, when the mobile computer has moved to an address space different from that of the home network to which it originally belongs, communications are carried out between the mobile computer and a packet relay device such as border gateway by using addresses of that visited site address space, while communications are carried out between the packet relay device such as border gateway and a packet transfer device such as home agent or a node such as a server device which is located inside the home network by using addresses of the home network, so that the mobile IP scheme can be used directly even when the mobile computer moves to the global address region outside the organization.

It is to be noted that the present invention is applicable not Just to the mobile IP as specified by RFC 2002, but also to any other mobile communication protocols as well.

It also is to be noted that the above described embodiment according to the present invention may be conveniently implemented in forms of software programs for realizing the operations of the border gateway and the mobile computer, as will be apparent to those skilled in the computer art. Appropriate software coding can readily be prepared by skilled programmers based on the teachings of the present disclosure, as will be apparent to those skilled in the software art.

In particular, each one of the entire border gateway of FIG. 7 and the entire mobile computer of FIG. 8 can be conveniently implemented in a form of a software package.

Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet relay device in a network system supporting a mobile computer that is capable of carrying out communications while moving over a plurality of interconnected networks, for relaying packets having an address of the mobile computer as a destination or source, the packet relay device comprising:

a packet receiving unit configured to receive a packet in a first format using a global address which is transmitted by the mobile computer for a location registration at a home network from a visited site managed by a global address system which is valid throughout the inter-connected networks, the packet being transmitted by using a global address of the packet relay device, and to check a content of the packet;

a packet transfer unit configured transfer the packet in a second format using a private address, to a correspondent computer in the home network of the mobile computer managed by a private address system which is valid only within the home network, according to the content of the packet, the packet being transferred by using a private address of the correspondent computer;

a first memory unit configured to store the private address of the packet relay device and the global address of the packet relay device, which are used by the packet receiving unit and/or the packet transfer unit; and a second memory unit configured to store a current location address of the mobile computer at the visited site, and a home address of the mobile computer in the home network, which are used by the packet receiving unit and/or the packet transfer unit.

2. The packet relay device of claim 1, further comprising:

a registration unit configured to register the current location address of the mobile computer into the second memory unit when the packet received from the mobile computer located at the visited site is a registration request packet containing the current location address of the mobile computer which is a packet destined to a mobile computer management device in the home network of the mobile computer.

3. A mobile computer device capable of carrying out communications while moving over a plurality of interconnected networks, comprising:

a current location setting unit for storing an information indicating whether or not the mobile computer device is currently connected to a private address space identical to that of a home network in which a mobile computer management device for managing a current location address of the mobile computer device and transferring a packet destined to the mobile computer device to the current location address is provided;

a relay device information unit for storing a global address in a global address space of a packet relay device which is provided at a border between the private address space and the global address space and relaying a packet to be exchanged between one computer connected to the private address space and another computer connected to the global address space;

a transmission unit for transmitting to the packet relay device at least a registration request packet that is containing the current location address and destined to the mobile computer management device, by using the global address stored by the relay device information unit, when the current location setting unit stores the information indicating that the mobile computer device is currently not connected to the private address space;

an automatic acquisition setting unit for setting whether or not an address at a visited site is to be automatically acquired; and a current location address unit for setting an address acquired by executing a prescribed protocol for having an address allocation as the current location address when the current location setting unit stores the information indicating that the mobile computer device is currently not connected to the private address space and the automatic acquisition setting unit indicates that the address at the visited site is to be automatically acquired.

* * * * *